United States Patent
Curlee et al.

(10) Patent No.: US 6,849,189 B2
(45) Date of Patent: Feb. 1, 2005

(54) HORIZONTAL REACTION CHAMBER COMPRISED OF NESTED, CONCENTRIC TUBES FOR USE IN WATER PURIFICATION

(75) Inventors: Richard Kevin Curlee, Bradenton, FL (US); Richard H. Paetsch, Sarasota, FL (US)

(73) Assignee: Mote Marine Laboratory, Sarasota, FL (US)

( * ) Notice: Subject to any disclaimer, the term of this patent is extended or adjusted under 35 U.S.C. 154(b) by 0 days.

(21) Appl. No.: 10/692,510

(22) Filed: Oct. 24, 2003

(65) Prior Publication Data

US 2004/0089611 A1 May 13, 2004

Related U.S. Application Data

(60) Provisional application No. 60/422,161, filed on Oct. 28, 2002.

(51) Int. Cl.[7] .............................. A01K 63/04; C02F 1/24
(52) U.S. Cl. .................... 210/703; 210/169; 210/221.2; 261/79.2; 261/156; 261/DIG. 75; 366/336; 366/338; 366/341; 119/264
(58) Field of Search ................................ 210/703, 169, 210/221.2; 261/79.2, 156, DIG. 75; 366/336, 338, 341; 119/264

(56) References Cited

U.S. PATENT DOCUMENTS

| | | | | |
|---|---|---|---|---|
| 3,770,384 A | * | 11/1973 | Brumfield | 261/122.1 |
| 3,772,192 A | * | 11/1973 | Hucksted et al. | 210/704 |
| 4,043,539 A | * | 8/1977 | Gilmer et al. | 366/340 |
| 4,070,302 A | * | 1/1978 | Chatterton | 261/53 |
| 5,078,867 A | * | 1/1992 | Danner | 210/169 |
| 5,800,704 A | * | 9/1998 | Hansen | 210/169 |

* cited by examiner

Primary Examiner—Thomas M. Lithgow
(74) Attorney, Agent, or Firm—Catherine J. Walsh; Cecilia A. Walsh

(57) ABSTRACT

The present invention includes a horizontal foam fractionation protein skimmer for removing organic waste material (dissolved organic compounds) from organic loaded water. The protein skimmer includes a horizontal reaction chamber connected to a foam collection chamber in which protein-loaded foam containing organic waste material is collected. The reaction chamber is comprised of a series of horizontally-directed, nested, concentric tubes for increasing the number and decreasing the size of bubbles to facilitate efficient removal of dissolved organic compounds. Each horizontal tube has either one or several small openings that are offset from the openings on the adjacent tube at a small angle, typically 10°. The openings are formed by either a single slit that runs along the length of each tube, or by a series of holes that runs along the length of each tube. Organic-loaded water is pumped through tubing into the reaction chamber. As water moves through the tubing, gas (e.g., air) is drawn in by eductors, creating a gas/water mixture. The gas/water mixture is distributed into the horizontal reaction chamber through a lateral manifold that tangentially injects the gas/water mixture at approximately equidistant points along the length of the reaction chamber. The gas/water mixture enters the largest of the nested horizontal tubes and is forced through the small opening(s) into the next smaller diameter tube.

Water travels circumferentially through adjacent tubes in a counter-current movement. The most central concentric tube carries the water out of the reaction chamber into the foam collection chamber. The water left behind is considerably more pure and free of contaminates and exits through tubing in the bottom of the foam collection chamber. The horizontal protein skimmer of the present invention is sectioned into individual components that facilitate transport and on-site assembly.

7 Claims, 15 Drawing Sheets

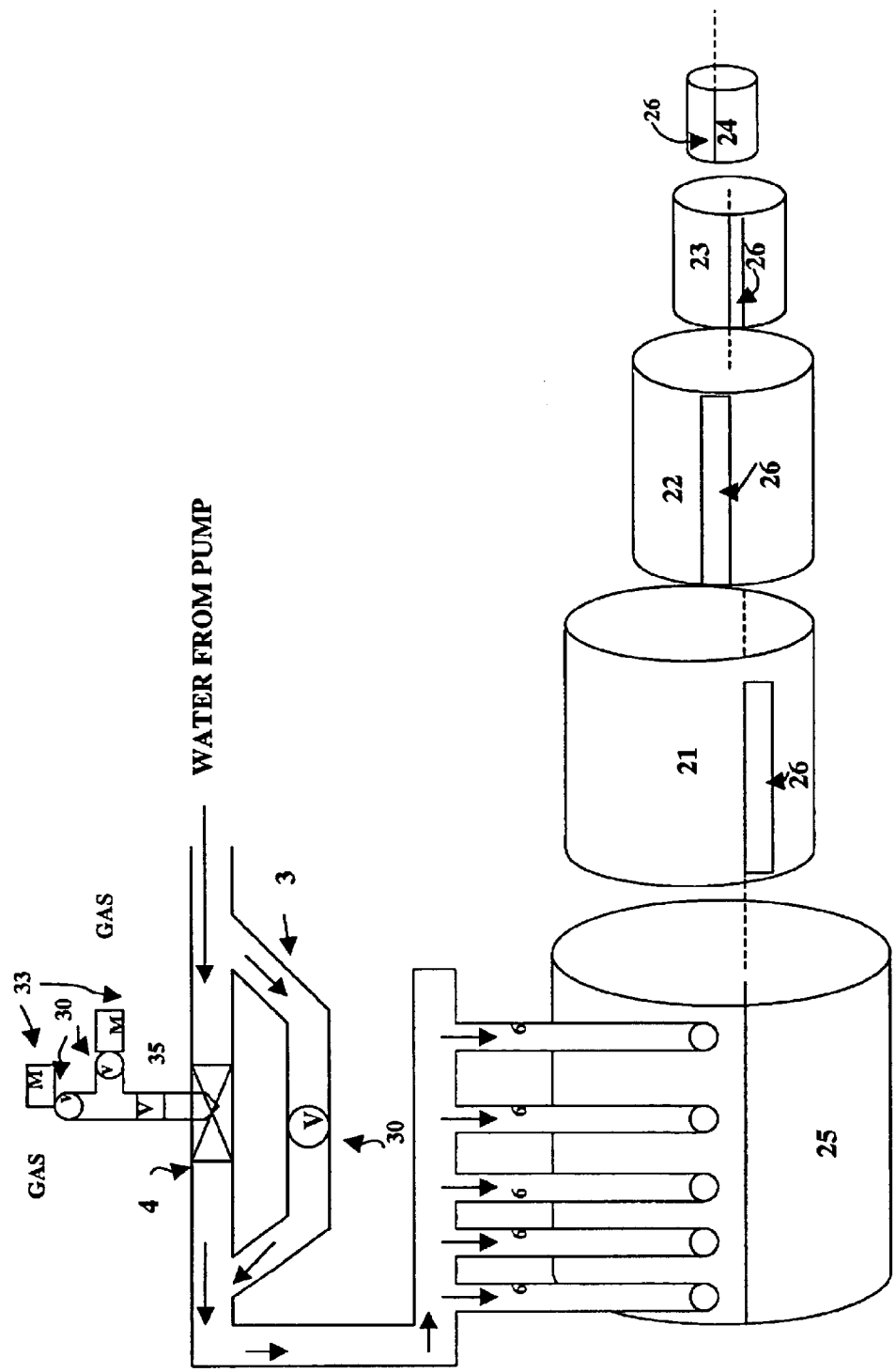

HORIZONTAL REACTION CHAMBER COMPRISED OF NESTED, CONCENTRIC TUBES FOR USE IN WATER PURIFICATION

CROSS REFERENCE TO RELATED APPLICATION

This application claims priority from Provisional Application Ser. No. 60/422,161, filed Oct. 28, 2002, entitled "Horizontal Reaction Chamber Comprised of Nested, Concentric Tubes for Use in Water Purification," the disclosure of which is incorporated herein by reference.

BACKGROUND OF THE INVENTION

1. Field of the Invention

This invention relates to a horizontal foam fractionation protein skimmer comprised of a horizontal reaction chamber for removing organic waste material from organic loaded water such as in aquaria, lagoons, wastewater, or other organic-loaded water sources, to methods of making such a horizontal protein skimmer, and to water purification methods utilizing such a horizontal protein skimmer.

2. Introduction to the Invention

Improved means of purifying water from a variety of organic loaded water sources are necessary. Methods of water purification and maintenance of good water quality are essential in purifying water from aquaria, lagoons, and from any organic-loaded water source, such as in wastewater treatment applications. This invention could also be useful for the pretreatment of effluent from agricultural wastewater applications such as in pig or chicken farms. The present invention is in the field of foam fractionation protein skimmers which are used to remove organic waste material from any organic loaded water source. For example, maintenance of water quality in aquarium tanks is a continuous and substantial challenge, particularly in public aquaria that have many large volume tanks. Organic waste contamination of water is a common and recurrent problem in aquaria. Foam fractionation protein skimmers help purify this contaminated water by using a naturally occurring foam fractionation action to produce a protein-loaded foam which contains the organic waste material extracted from organic loaded water. Protein skimmers are known and have been proven to be effective in helping maintain water quality in aquarium tanks.

A properly functioning protein skimmer effectively oxygenates water that passes through the body of the skimmer by introducing a large number of small gas or air bubbles into the water. A protein skimmer also serves as a method for water purification by allowing introduced bubbles to react with surrounding water molecules and pollutants to attach to surfaces of bubbles. The bubble-water mixture becomes foam which can be readily separated from the considerably more pure water that is produced by the protein skimmer. The bubbles are directed out of the reaction chamber of the skimmer and collected, along with adherent pollutants, in a collection vessel. In this manner, organic waste material can be permanently removed from a water system.

Several features can make some protein skimmers more effective than others. Overall water flow rate through the protein skimmer is important. The more water that is processed per unit time generally means more waste material is removed and more gas exchange occurs. The amount of contact time between air bubbles and water and the quality of this contact time is important as well. If bubbles are immediately withdrawn from the skimmer as soon as they are introduced, they may not be fully saturated with waste material. If bubbles react with water in a laminar, non-turbulent fashion, contact time between bubbles and waste material is reduced and bubbles may not be fully saturated with waste material. In either case, maximum efficiency can be compromised.

The number and size of bubbles is also important. A large number of bubbles increases the amount of waste material that can be skimmed out using a protein skimmer. Numerous small bubbles afford greater surface area for the air-water interaction than do the same volume of large bubbles. These are important aspects of protein skimming which contribute to a given protein skimmer's efficiency and success. In general, the goal is to maximize the number and to minimize the size of the bubbles, and to maximize the length of time the bubbles are in contact with water.

Typical protein skimmers in public aquaria are very tall (e.g., greater than 8 feet in height), very bulky, and difficult to maintain. Limited space, both floor space and headspace, is often a major concern in public aquaria, particularly in aquaria in which displays are frequently added, changed, or remodeled. These frequent alterations result in typical protein skimmers being too tall and too bulky to fit in many of the areas where they are needed. Additionally, most typical protein skimmers require substantial maintenance, which is difficult and often treacherous on very tall protein skimmers, particularly as structures are built around existing protein skimmers and space becomes increasingly more limited.

BRIEF SUMMARY OF THE INVENTION

In accordance with the present invention, there is provided a new foam fractionation protein skimmer for effectively removing organic waste material from any organic loaded water source. The skimmer operates using a unique horizontal reaction chamber containing a plurality of nested, horizontally-directed, concentric tubes with offset openings, which can be in the form of narrow slits or small holes. The horizontal reaction chamber of the present invention can prolong the contact time between air or gas bubbles and protein loaded water for improving the efficacy of a naturally occurring skimming action for producing protein-loaded foam. The contact time between bubbles and water is prolonged by the unique arrangement of the plurality of nested, concentric tubes contained within the horizontal reaction chamber. Turbulence is created in the horizontal reaction chamber by a combination of eductors drawing gas to mix with water into the tubing leading to the reaction chamber, high velocity of water moving through the concentric tubes, counter-current water movement, and shear force of water moving through the small offset openings in each tube.

The outlet compartment of the foam fractionation protein skimmer of the present invention can direct the more pure water downward and out while the contaminated foam rises to the top. Contaminates in the water attach themselves to the bubbles and rise to the surface of the water as foam which is collected in a foam collection container attached to the top of a foam riser. The water left behind is substantially more pure and is directed out of the reaction chamber through a pipe or tube, which can be made from PVC. The protein removal system of the subject invention is particularly useful in the aquarium field because it fits into very small spaces and requires very little headroom. Additionally, the protein removal system of the subject invention is sectioned into components which can be easily transported and assembled on-site. A specific advantage of the present invention is that the unique horizontal reaction chamber can be retrofitted into existing protein skimmers, which can make it ideal for growing aquaria that need to replace older protein skimmers that no longer function adequately.

The horizontal reaction chamber of the present invention also allows for increased contact time between bubbles and water, more efficient bubble production, and substantially more efficient waste removal than existing vertical skimmers. Additionally, the protein removal system of the present invention has the advantages of requiring very little headspace, having a very small footprint, and being easy to assemble and maintain throughout the lifetime of the skimmer. The protein skimmer described herein is only approximately 2–3' tall compared to the 8–10' height of prior art protein skimmers, yet is able to process large volumes of water in a short period of time. Multiple horizontal reaction chambers may be used simultaneously to increase water purification capacity.

The horizontal reaction chamber can be used in processes where it is desirable to incorporate or mix small gas bubbles efficiently into liquids. Such processes may include water purification (e.g., protein skimmers), food processing, and foam fabrication.

The present invention includes a horizontal reaction chamber to create a turbulent environment for producing a maximum number of bubbles of a desired small size and for maximizing effective contact time between the bubbles and water. This method generates massive numbers of bubbles in a small, confined space, and eliminates the need for a tall, bulky reaction chamber requiring a considerable amount of space and maintenance. Once a gas/water mixture enters the horizontal reaction chamber, the mixture is subjected to high levels of shear force, resulting in fiercely turbulent mixing. The high velocity of the gas/water mixture moving through the concentric tubes and the small offset openings, in combination with the counter-current movement of the water, increases shear force. This results in greater bubble frequency and smaller bubble size which can optimize removal of organic waste from water.

The primary applications of the current invention have been conducted using salt or brackish water (15 ppt–38 ppt), but the invention will likely function in freshwater.

Therefore, in a first aspect this invention provides:

A horizontal reaction chamber for incorporating small gas bubbles into a liquid comprising:

(A) an inlet for receiving a gas/liquid mixture,
(B) a plurality of nested and concentric tubes each having essentially the same length, including an innermost tube and an outermost tube,
(C) a physical barrier between each pair of adjacent tubes extending along the length of the tubes, wherein the physical barriers are generally co-linear with each other, and
(D) means for securing the position of the tubes relative to each other;
wherein each of the concentric tubes contains an opening along its length such that the openings in adjacent tubes are proximal to the physical barrier between the adjacent tubes and are on alternate sides of the barrier such that flow in adjacent tubes occurs in opposite circumferential directions, and the innermost tube comprises an outlet.

Therefore, in a second aspect, this invention provides

A protein removal system for removing organic waste from contaminated water comprising:

(A) an injector for providing the contaminated water,
(B) an eductor for providing gas into the contaminated water,
(C) a manifold for dispersing the contaminated water containing gas comprising a plurality of ports,
(D) a horizontal reaction chamber for creating small bubbles of the gas in the contaminated water comprising:
  (1) a plurality of inlets corresponding to the plurality of ports on the manifold,
  (2) a set of nested, concentric tubes each having essentially the same length including an innermost tube,
  (3) a physical barrier between each pair of adjacent tubes extending along the length of the tubes, wherein the physical barriers are generally co-linear with each other,
  (4) means for securing the position of adjacent tubes, and
  (5) an end plate capping one end of the chamber;
  wherein each of the concentric tubes contains an opening along its length such that the openings in adjacent tubes are proximal to the physical barrier between the adjacent tubes and are on alternate sides of the barrier such that flow in adjacent tubes occurs in opposite circumferential directions, and the innermost tube comprises an outlet; and
(E) a foam collection chamber which receives the contaminated water comprising the small gas bubbles from the outlet of the horizontal reaction chamber, comprising:
  (1) a foam riser for collecting foam from the top of the foam collection chamber, and
  (2) a tube or pipe for allowing purified water to exit the foam collection chamber.

In a third aspect, this invention provides

A method for removing organic waste from contaminated water from any water source containing organic-loaded water, such as large volume aquarium tanks, lagoons, effluent from agricultural applications, wastewater, or other water sources, comprising the steps of:

(A) mixing the contaminated water with gas,
(B) providing a horizontal reaction chamber for creating small bubbles of the gas in the contaminated water comprising:
  (1) an inlet for the contaminated water and gas mixture,
  (2) a set of nested, concentric tubes each having essentially the same length including an innermost tube and an outermost tube,
  (3) a physical barrier between each pair of adjacent tubes extending along the length of the tubes, wherein the physical barriers are generally co-linear with each other,
  (4) means for securing the position of the adjacent tubes, and
  (5) an end plate capping one end of the chamber;
  wherein each of the concentric tubes contains an opening along its length such that the openings in adjacent tubes are proximal to the physical barrier between the adjacent tubes and are on alternate sides of the barrier such that flow in adjacent tubes occurs in opposite circumferential directions, and the innermost tube comprises an outlet directed to a collection chamber; and
(C) introducing the mixture of contaminated water and gas into the inlet of the horizontal reaction chamber so that the reaction chamber creates a high concentration of small gas bubbles in the contaminated water resulting in a foam, (D) collecting the foam from the outlet in the collection chamber and disposing of it, and (E) collecting purified water through a tube or pipe exiting the collection chamber.

BRIEF DESCRIPTION OF THE DRAWINGS

A more complete appreciation of the invention and many of the advantages of the invention can be better understood by reference to the previous description when considered in connection with the accompanying drawings, wherein:

FIG. 11 is a schematic illustration of the assembly of the nested concentric tube apparatus with single injector assembly with inverted eductor arrangement and meters for regulating gas flow which comprises the horizontal reaction chamber;

DETAILED DESCRIPTION OF THE INVENTION

The present invention includes a protein skimmer including a horizontal reaction chamber to efficiently remove organic waste from water. The horizontal reaction chamber contains a plurality of nested concentric tubes each having at least one opening along its length, preferably a series of small openings along its length. In addition, there is a physical barrier positioned between each pair of adjacent nested concentric tubes, with the physical barriers extending essentially along the entire length of the tubes. There may be one solid partition which extends through all the concentric tubes to provide the barriers, or individual barriers may be provided for each adjacent pair of adjacent tubes. The opening or pattern of openings in each concentric tube is positioned close to the barrier and is offset from the opening or pattern of openings in the next smaller diameter tube, with the direction of the offset relative to the barriers alternating between clockwise and counterclockwise throughout the series of tubes. The amount of offset is preferably approximately 10° (i.e., alternating from +10° to −10° to +10° to −10°, and so on), however offsets up to 25° or 30° may be used. The openings can comprise narrow slits or a series of small equidistant holes. This orientation of the openings and barriers in the concentric tubes is used to generate fierce turbulence resulting in a large number of small bubbles, thereby maximizing the effective contact time between bubbles and water.

Figure 1:
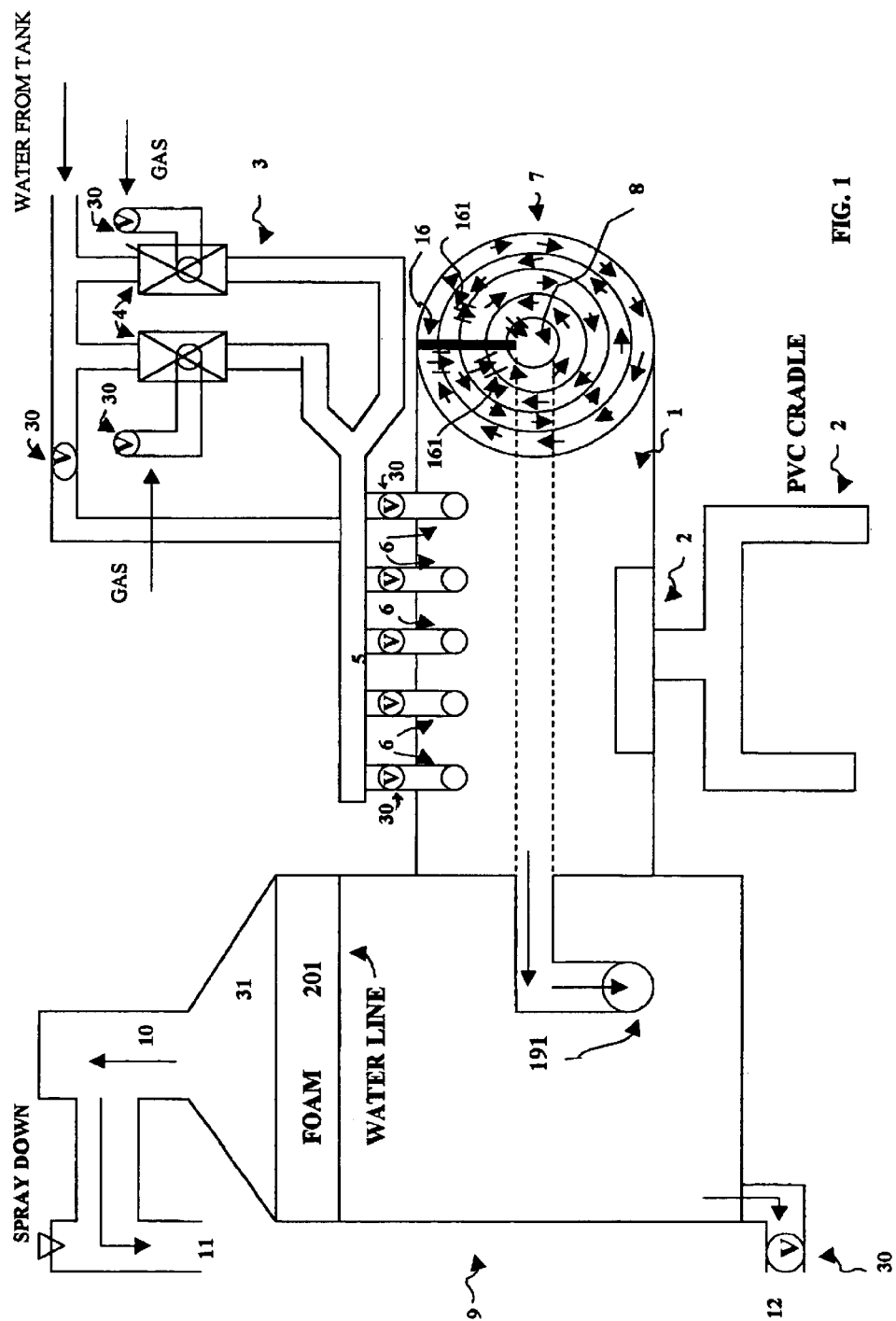
FIG. 1 is a schematic illustration of the horizontal protein skimmer of the present invention.

FIG. 1 shows a schematic view of a protein skimmer with a horizontal reaction chamber (1) being supported by a cradle, preferably made of PVC (2). Contaminated water flows through an injector assembly (3), is mixed with one or more gases (e.g., air or ozone) through one or more eductors (4), and then is distributed into the horizontal reaction chamber (1) using a lateral manifold (5) with multiple (e.g., four or five) injector ports (6). The injector ports (6) may have valves (30). Inside the horizontal reaction chamber (1), the contaminated water mixed with gas is forced through narrow openings in a set of nested concentric tubes (7). The gas/water mixture travels around the inner wall of the largest diameter tube until it hits a physical barrier (16), it is then forced through the narrow openings (161) into the next smaller diameter tube and travels in a counter-current direction relative to water in the next largest tube, and so on. Once inside the smallest diameter tube (8), water is forced out into the foam collection chamber (9) through an opening (191). In the foam collection chamber (9), the foam (201) containing contaminates rises through the foam riser (10) connected with a diameter reduction fitting (31) and is removed through an exit (11). Contaminated foam is cleared using a spray-down and routed to a containment vessel where it can be removed by pumping. Purified water exits the foam collection chamber (9) through a pipe or tube (12), controlled by a valve (30).

Figure 2:
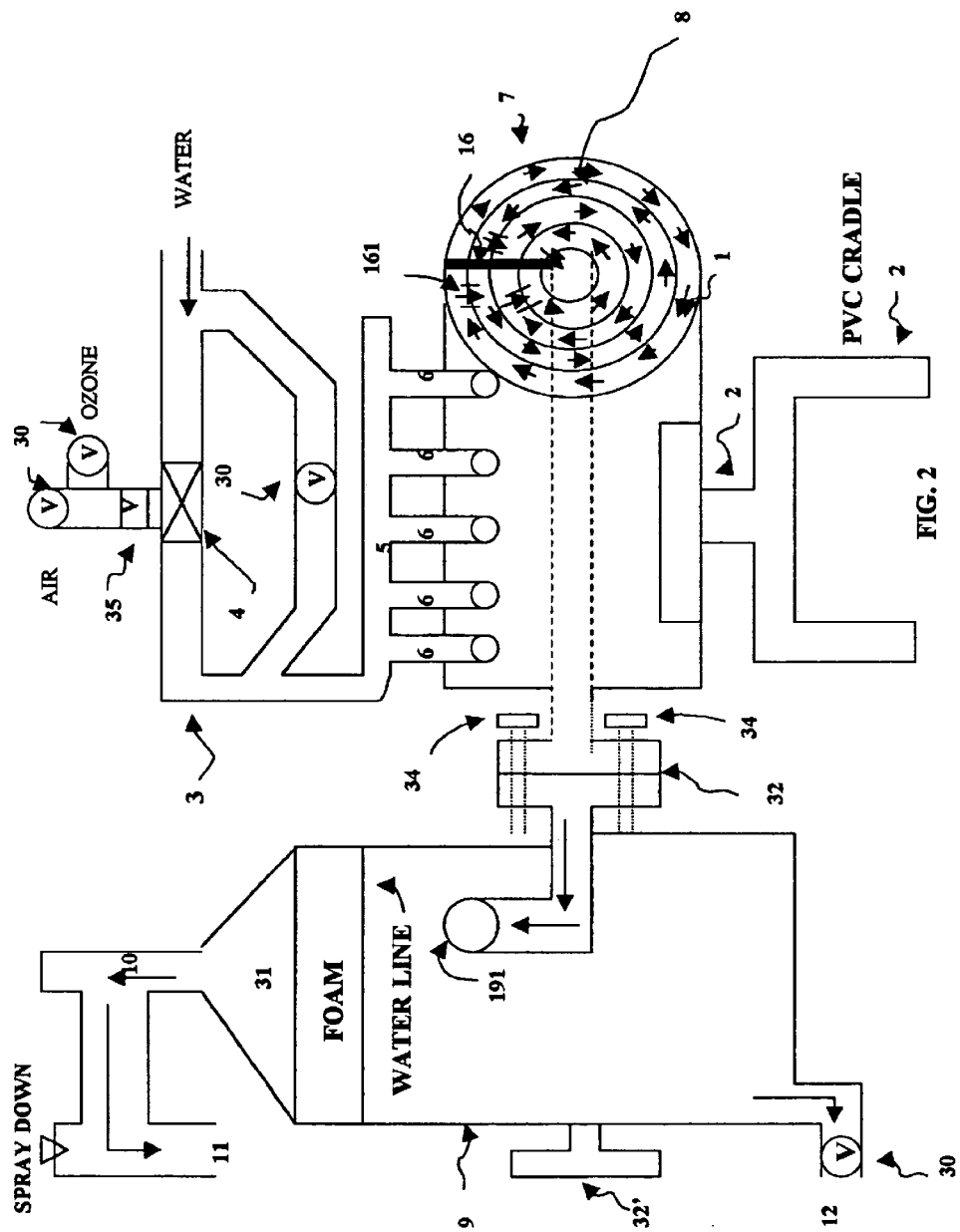
FIG. 2 is a schematic illustration of the horizontal reaction chamber of the present invention showing flange attachment and single injector assembly.
Figure 2A:
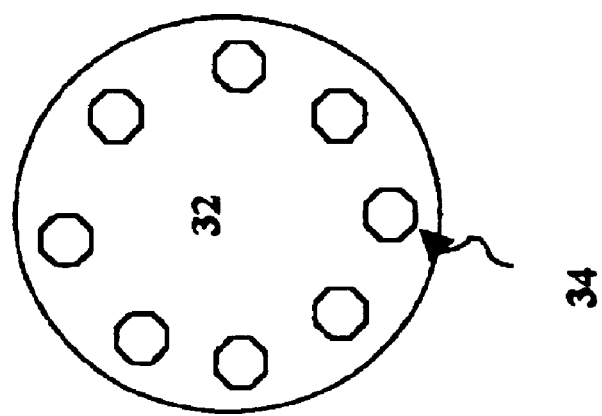
FIG. 2A is an end view of the flange at one end of the horizontal reaction chamber.

FIG. 2 shows a schematic view of the protein skimmer with a horizontal reaction chamber shown in FIG. 1, with the horizontal reaction chamber (1) coupled to the foam collection chamber (9) by means of a flange (32). The flanges are attached using flange bolts (34). The flange and flange bolts are preferably made from PVC. An enlarged view of the flange (32) and flange bolts (34) is shown in FIG. 2A. The horizontal reaction chamber (1) has a single injector assembly (3) and the injector ports (6) do not have valves. The injector assembly has an inlet for air and an inlet for ozone, with gas flow controlled by valves (30). A unidirectional valve (35) is also included on the injector assembly before the eductor (4). An additional flange (32') on the foam collection chamber (9) allows attachment of multiple horizontal reaction chambers simultaneously.

Figure 3:
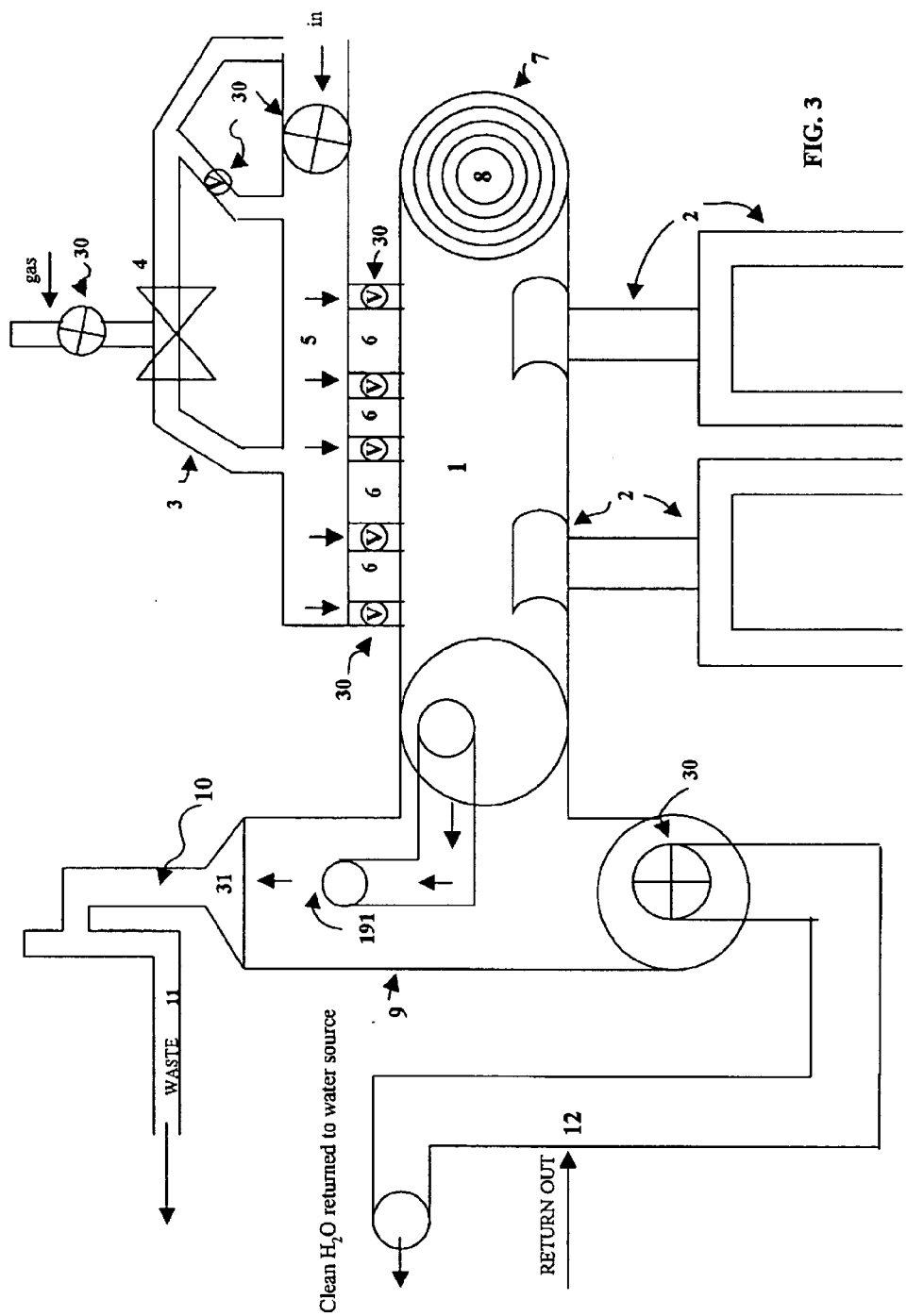
FIG. 3 is a schematic illustration of the horizontal protein skimmer for smaller volume water sources.

FIG. 3 shows a schematic view of a protein skimmer with a horizontal reaction chamber (1) for use with smaller volumes of water. It has a single injector assembly (3) for reduced flow rate.

Figure 4:
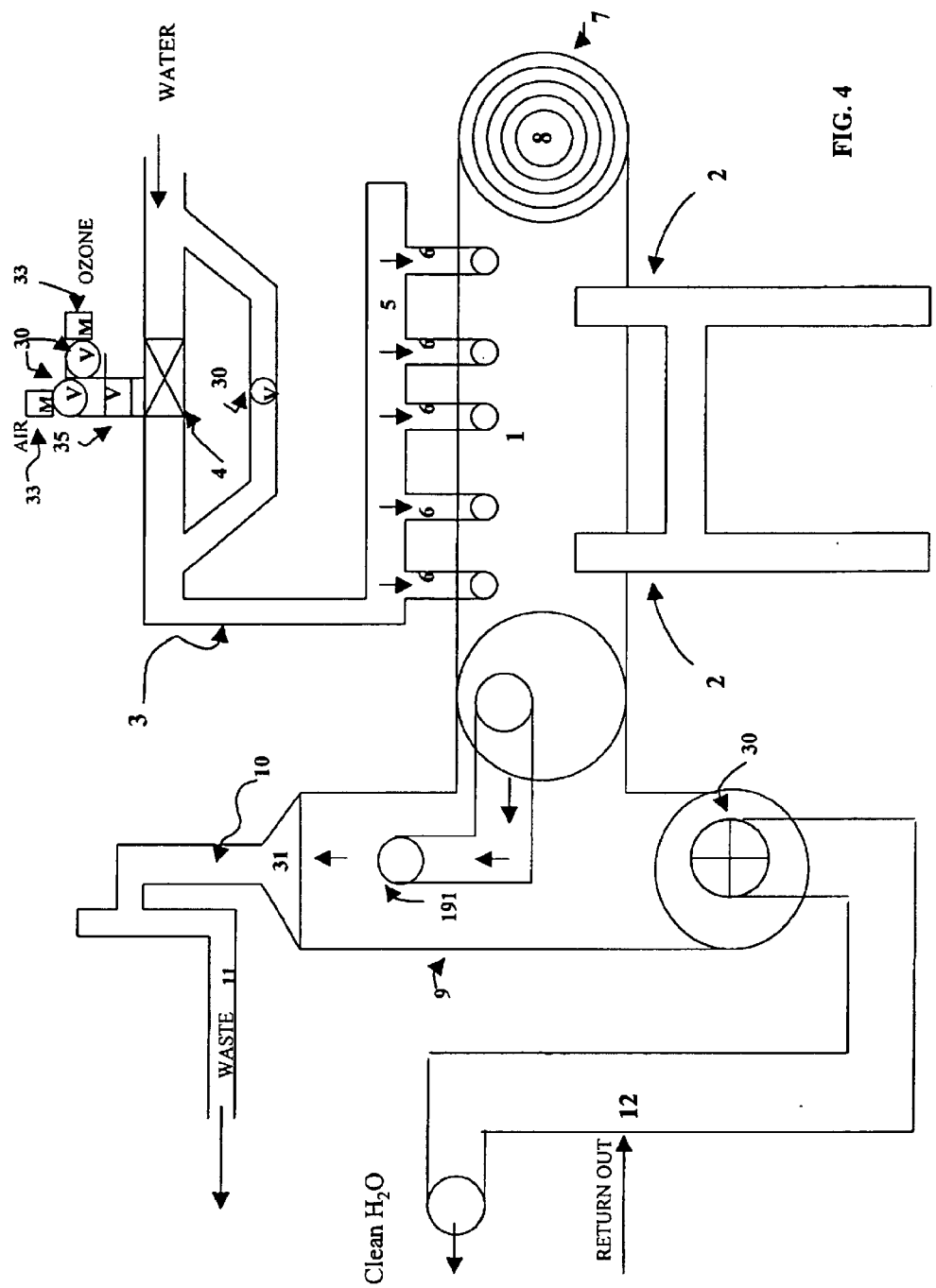
FIG. 4 is a schematic illustration of the horizontal reaction chamber showing a single injector assembly with inverted eductor arrangement.

FIG. 4 shows a schematic view of a protein skimmer with a horizontal reaction chamber (1) with a single injector assembly (3). The injector assembly has the eductor (4) on the straight portion of the injector assembly to increase efficiency and stability. Valves (30) are attached to the eductor to allow fine-tuning of gas flow and meters (33) are attached to valves to allow consistent setting of flow rates. A unidirectional valve (35) is included to prevent backflow.

Figure 5:
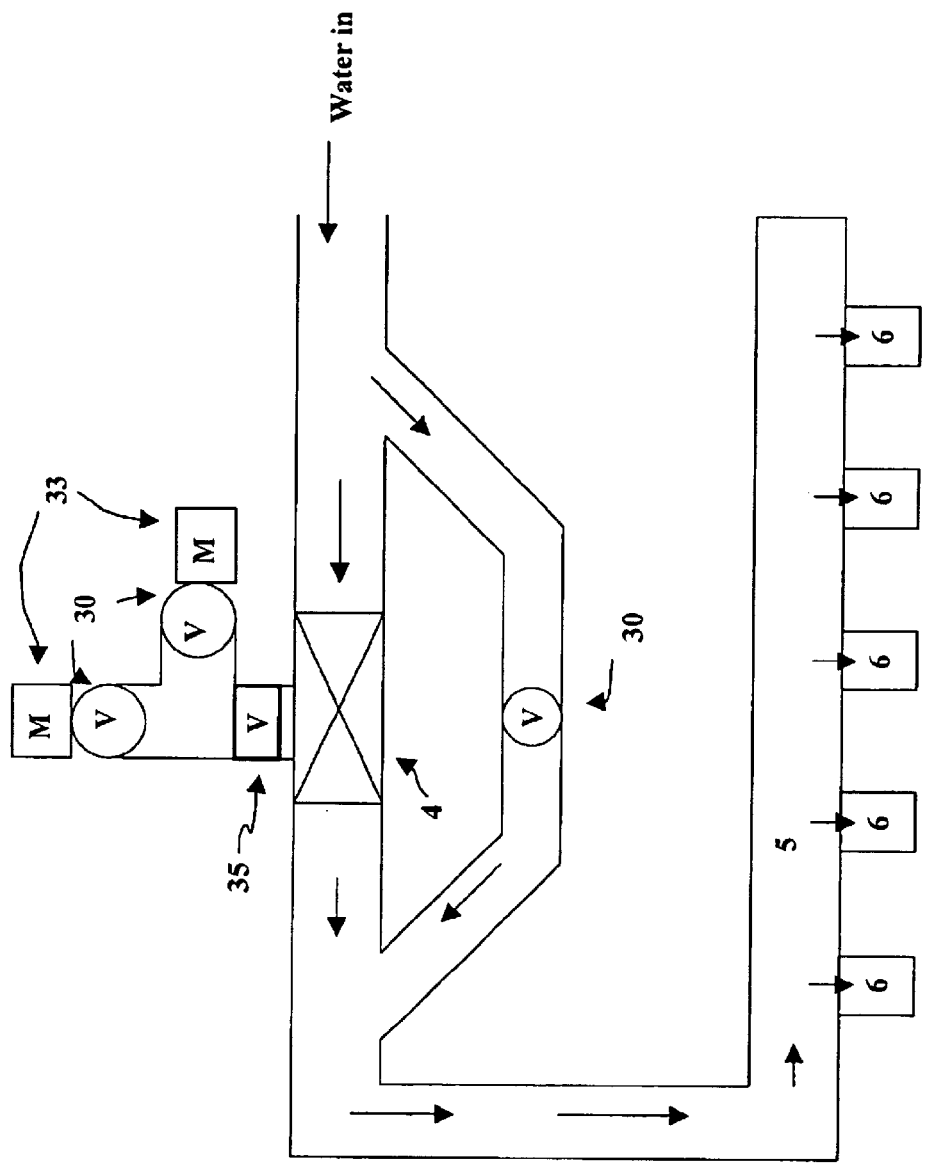
FIG. 5 is a schematic illustration of the inverted eductor arrangement.

FIG. 5 shows a schematic view of an injector assembly. Water travels into the injector assembly, through an eductor (4), into the lateral manifold (5), and enters the horizontal reaction chamber through a series of injector ports (6). Valves (30) are attached to the eductor to allow fine-tuning of gas flow and meters (33) are attached to allow consistent setting of flow rates. A unidirectional valve (35) is included to prevent backflow.

Figure 6:
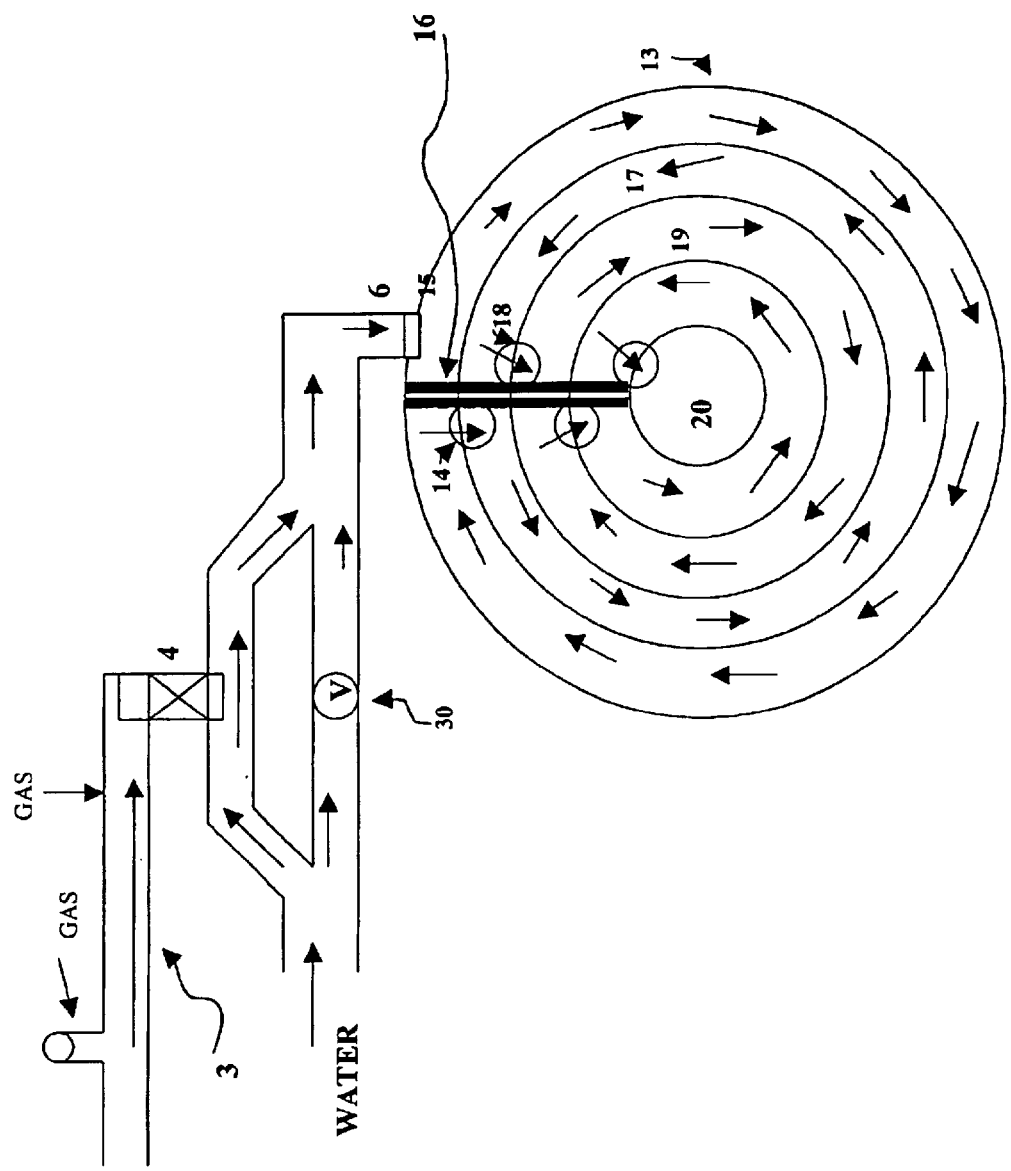
FIG. 6 is a schematic illustration of the nested, horizontally-directed, concentric tubes, the direction of water movement, the location of offset openings, the center line partition, as well as the relationship of the lateral manifold which distributes the air/water mixture into the horizontal reaction chamber.

FIG. 6 shows an expanded view of the interior components of the horizontal reaction chamber (1) in cross-section. The injector assembly (3) is comprised of an eductor (4) for the gas (e.g., air or ozone) and injector (6) for the liquid (e.g., water). A water and gas mixture is thereby formed and is injected into the reaction chamber through an injector (6). The water/gas mixture is injected into the outermost tube (13) at a site (15). Water travels around the outermost tube until it reaches the physical barrier (e.g., a bolt or partition) (16) and then is forced through a first narrow opening (14) approximately −10° from the water injection site (15). The water/gas mixture moves through the narrow opening (14) into the second innermost tube (17). The water/gas mixture flows in a direction opposite to the direction of water flowing through the outermost tube (13). Water travels through this tube (17) until it reaches the barrier (16) and a second narrow opening (18) that is +10° from the first narrow opening (14) of the previous tube. Water moves through the second narrow opening (18) and travels through the third innermost tube (19) in a counter-current direction to the previous water flow. This process continues until the water/gas mixture reaches the most central tube (20) of the horizontal reaction chamber.

Figure 7:
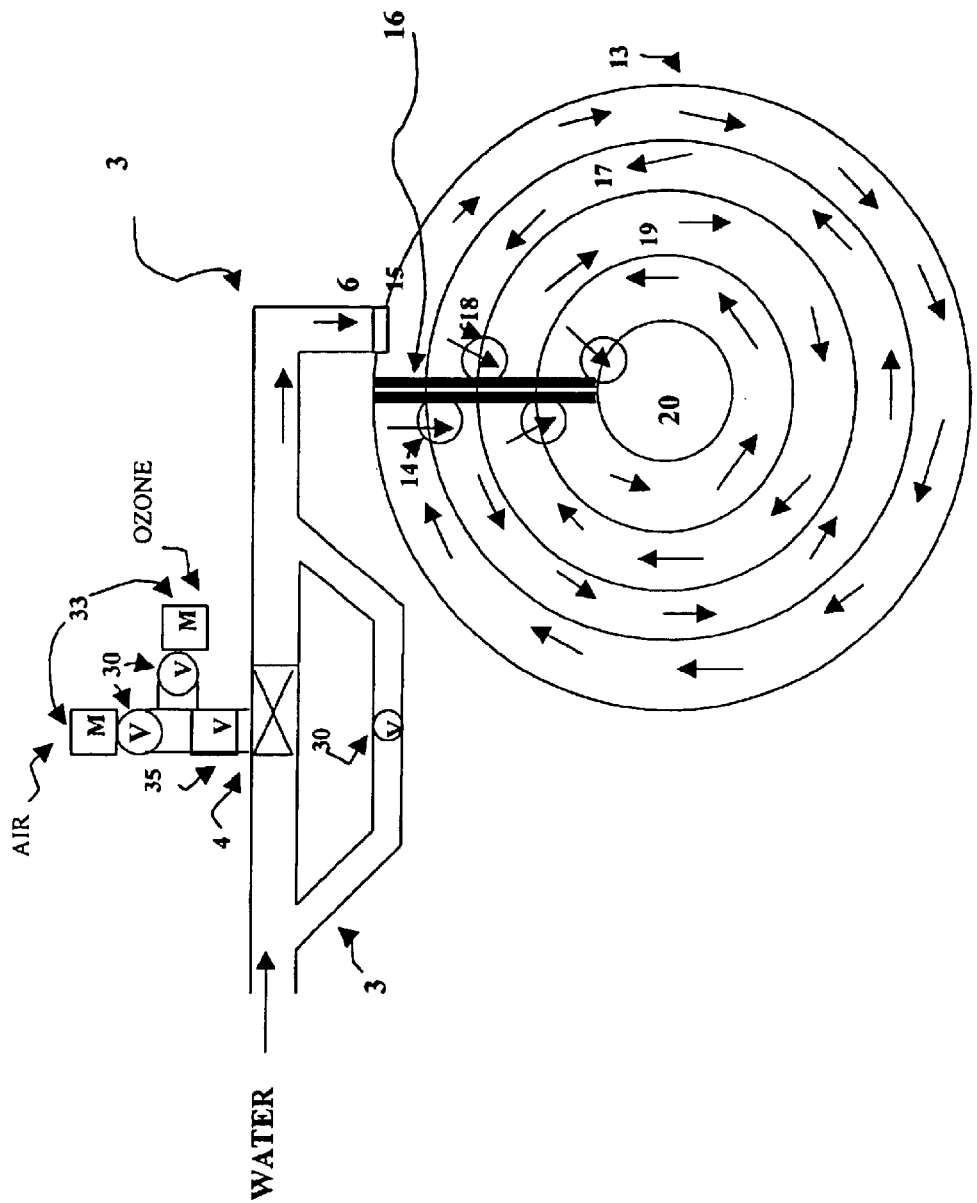
FIG. 7 is a schematic illustration of the nested, horizontally-directed, concentric tubes, the direction of water movement, the location of offset openings, the center line partition (i.e., physical barrier), the relationship of the lateral manifold which distributes the air/water mixture into the horizontal reaction chamber, and a single injector assembly with straight-line eductor arrangement.

FIG. 7 shows an expanded view of the interior components of horizontal reaction chamber (1) in cross-section shown in FIG. 6, wherein the injector assembly (3) has the eductor (4) on the straight portion of the injector assembly to increase efficiency and stability. Valves (30) are attached to the eductor to allow fine-tuning of gas flow and meters (33) are attached to valves to allow consistent setting of flow rates.

Figure 8:
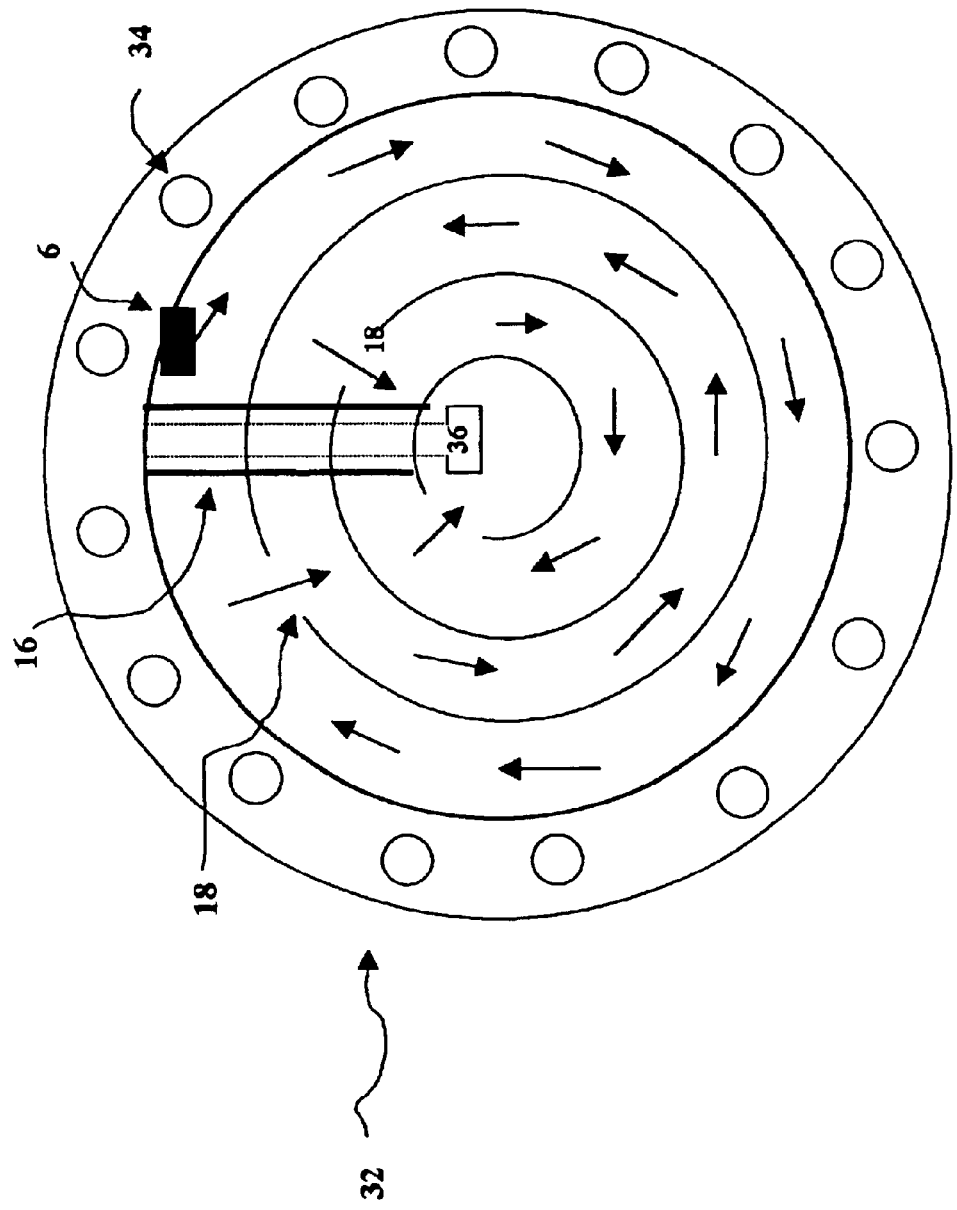
FIG. 8 is a schematic illustration of the nested, horizontally-directed, concentric tubes and the direction of water movement as in FIG. 7, with the location and arrangement of PVC flange bolts shown as well as the fiberglass bolt with partitions on either side holding the nested concentric tubes together.

FIG. 8 shows a cross-sectional view of the horizontal reaction chamber. Water enters the horizontal reaction chamber through an injector port (6). The flange (32) on the end of horizontal reaction chamber is attached by means of flange bolts (34). The nested, concentric tubes are secured by means of one or more fiberglass bolts (36) which can have PVC resin or baffles on either side to create a barrier to block water flow, forcing water through the small openings (18). Water travels in a counter-current direction and enters into the next smaller diameter tube through small openings (18).

Figure 9:
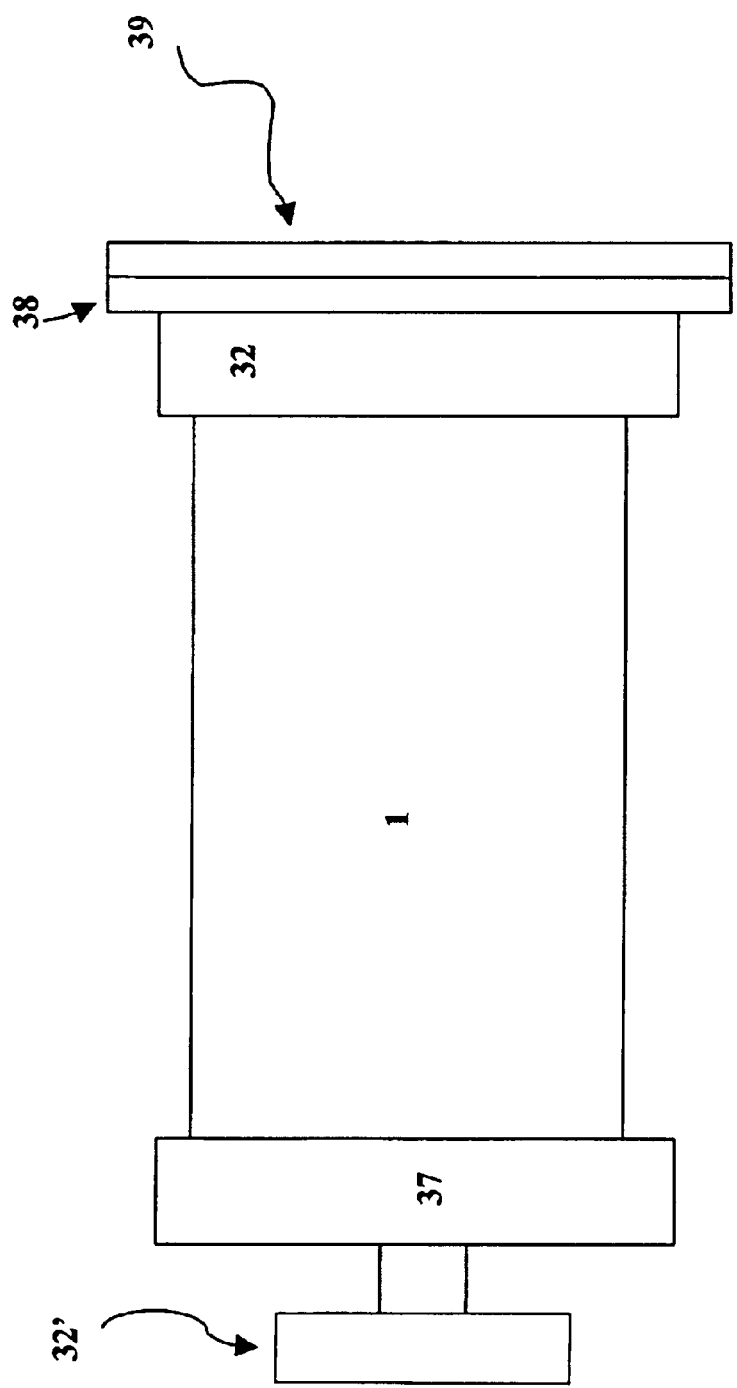
FIG. 9 is a schematic view of the horizontal reaction chamber showing arrangement of PVC flanges, silicone gasket, and perforated cap.

FIG. 9 shows a schematic drawing of a horizontal reaction chamber (1) with flanges (32 and 32') at either end. A gasket (38) and either an end plate or blind flange (39) is at one end of the horizontal reaction chamber. The gasket is preferably made of silicone or other suitable material. The end plate is preferably made of acrylic or other suitable material. A perforated cap (37) allows a tube carrying water to exit the horizontal reaction chamber.

Figure 10:
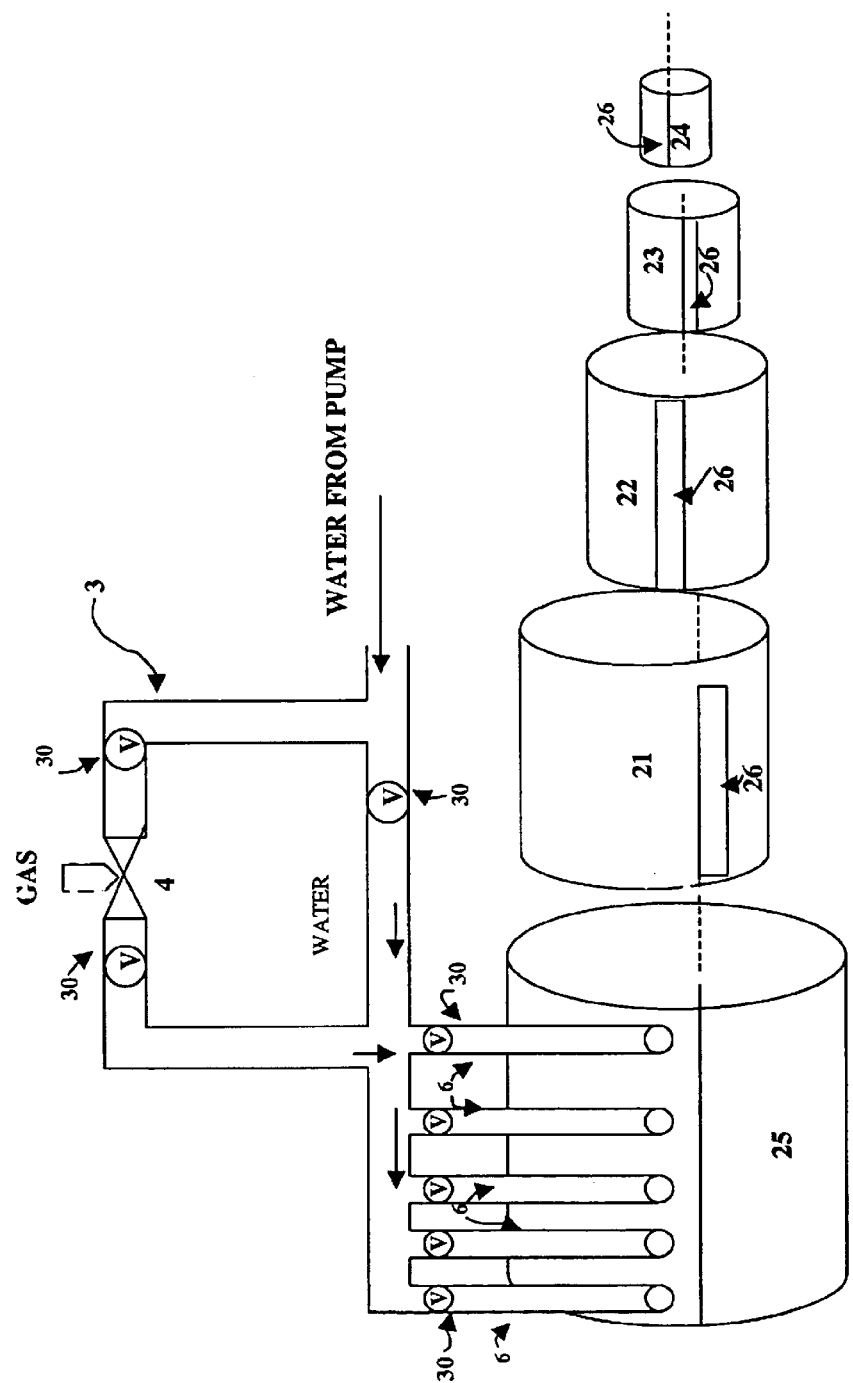
FIG. 10 is a schematic illustration of the assembly of the nested concentric tube apparatus which comprises the horizontal reaction chamber.

FIG. 10 shows an assembly of tubes to result in the nested horizontally-directed concentric tube configuration (7) of the horizontal reaction chamber (1) of the current invention. Increasingly smaller diameter tubes (21–24) are inserted inside a larger diameter tube (25). Each tube has a narrow opening (26) that is offset by a small angle from the opening in the previous tube in an alternating sequence (i.e., the opening (26) in tube (22) is offset relative to the opening (26) in tube (21) by a small clockwise rotation, whereas the opening (26) in tube (23) is offset from the opening (26) in tube (22) by a small counterclockwise rotation).

FIG. 11 shows an assembly of tubes to result in the nested horizontally-directed concentric tube configuration (7) of the horizontal reaction chamber (1) as shown in FIG. 10, wherein the injector assembly (3) has the eductor (4) on the straight portion to increase efficiency and stability. Valves (30) are attached to the eductor (4) to allow fine-tuning of gas flow and meters (33) are attached to valves to allow consistent setting of flow rates.

Figure 12A:
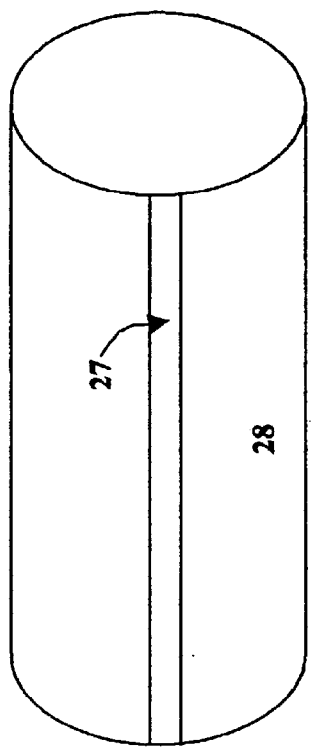
FIGS. 12A and 12B each shows a schematic illustration of the offset openings in the tubes as a) narrow slits, or b) small equidistant holes of equal size.
Figure 12B:
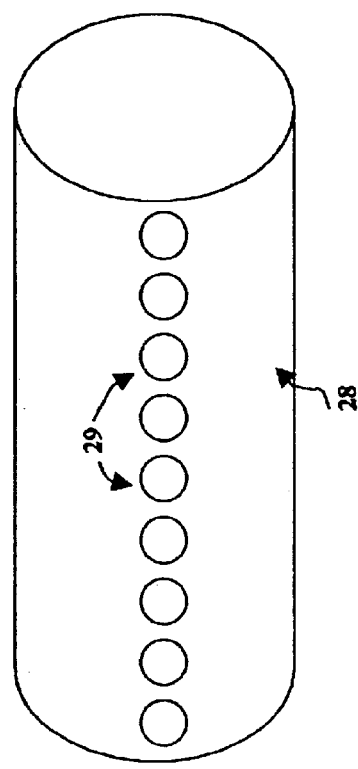

FIG. 12 shows examples of the narrow openings (26) that can be used with the horizontal reaction chamber (1). FIG. 12A shows the opening as a narrow slit (27) in each tube (28). FIG. 12B shows the opening as a series of small equidistant holes of equal size (29) in each tube (28).

Figure 13:
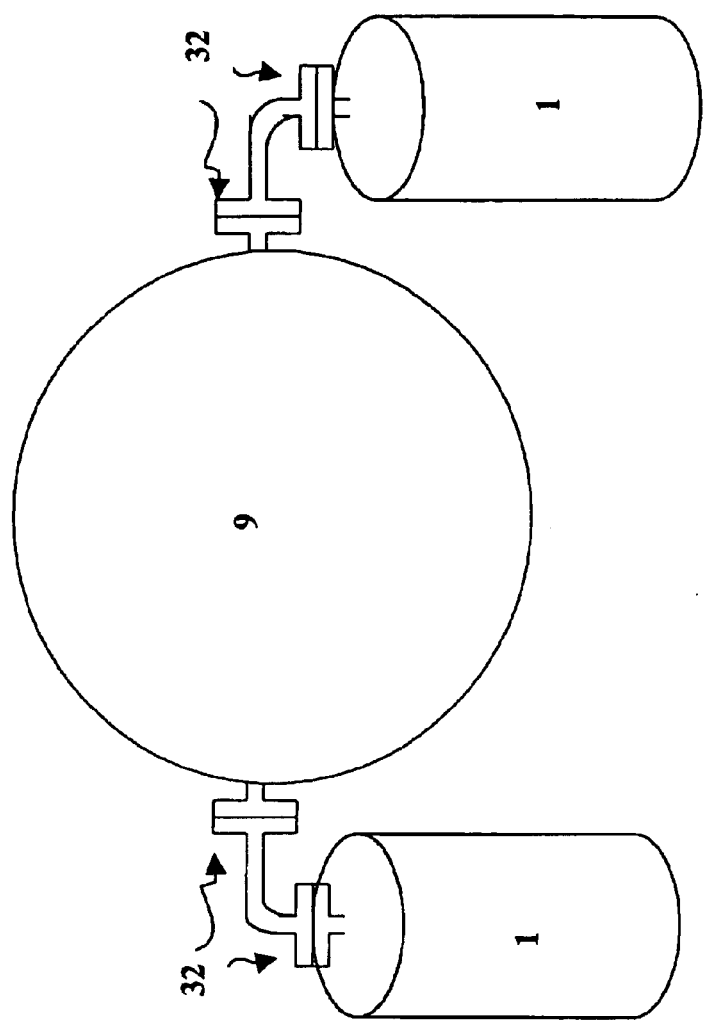
FIG. 13 is a schematic illustration of the possible arrangement for using two horizontal reaction chambers simultaneously with one large diameter (3–8 ft) foam collection chamber.

FIG. 13 shows an arrangement of multiple horizontal reaction chambers (1) and a single foam collection chamber (9) coupled with flanges (32) for use of two horizontal reaction chambers (1) simultaneously.

Figure 14:
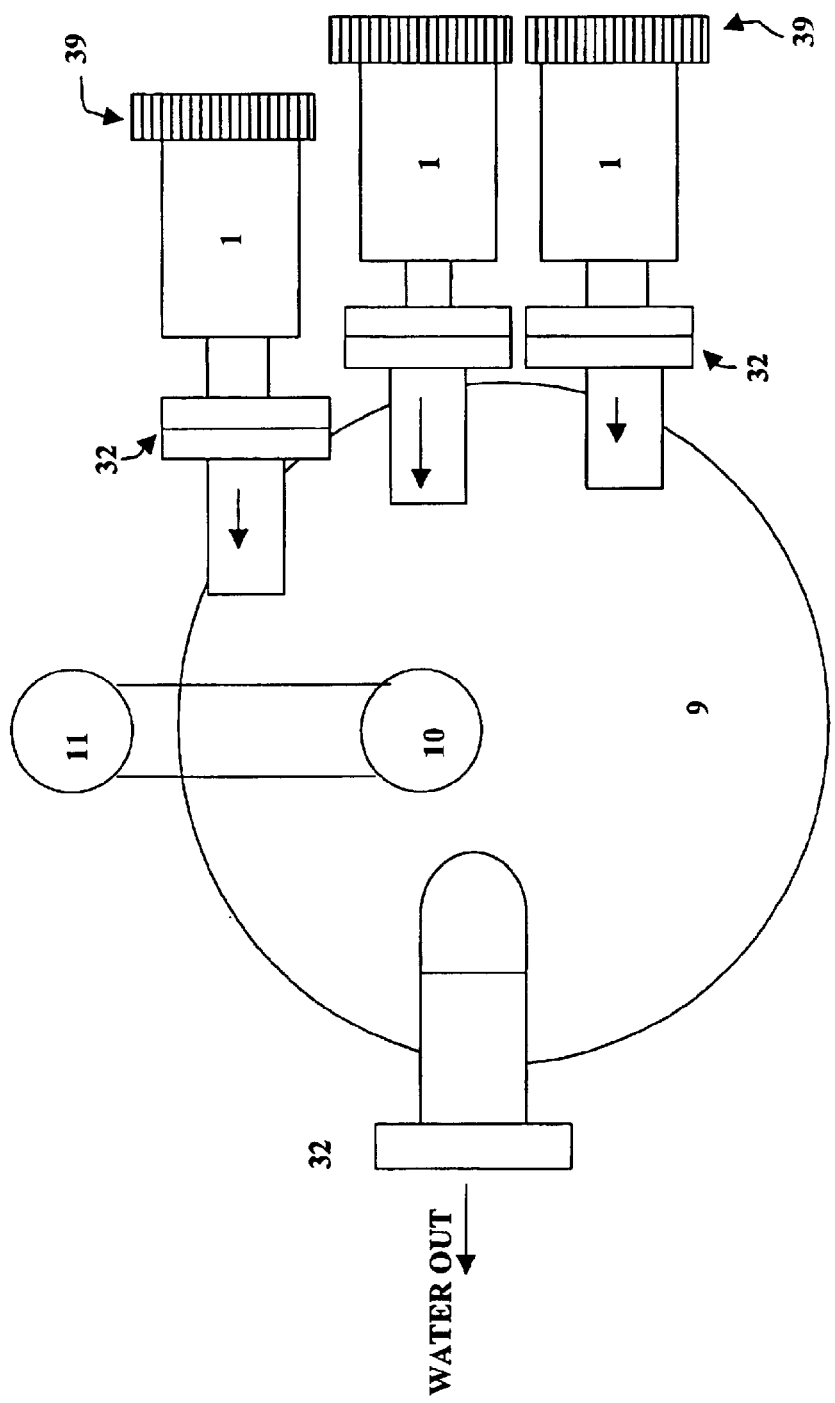
FIG. 14 is a schematic illustration of the possible arrangement for using three horizontal reaction chambers simultaneously with one 6' diameter foam collection chamber.

FIG. 14 shows an arrangement of multiple horizontal reaction chambers (1) and a single foam collection chamber (9) coupled with PVC flanges (32) for use of three horizontal reaction chambers with a foam collection chamber of 6" diameter. Foam rises in the foam riser (10) and exits through the foam exit (11). An acrylic end plate or blind flange (39) is shown at the end of each horizontal reaction chamber.

The water to be purified is supplied to the skimmer by a pump. The primary applications of the current invention have been conducted using salt or brackish water (15 ppt–38 ppt), but the invention will likely function in freshwater. The gas/water mixture enters the largest of the concentric horizontal tubes and is forced through the narrow slit or series of small holes into the next smaller diameter tube, which is then forced through the opening in that tube into the next smaller diameter tube. Water travels through adjacent tubes in a circumferential counter-current movement. The high velocity of the gas/water mixture moving through the concentric tubes and the small, alternating, offset openings, in combination with the counter-current movement, increases shear force, resulting in greater bubble frequency and smaller bubble size, which is optimal for removing organic waste from water.

The most central concentric tube carries the water out of the mixing chamber into the foam collection chamber. The foam rises to the top of the foam collection chamber and carries contaminates with it. This method generates massive numbers of bubbles in a small, confined space, which eliminates the need for a tall, bulky reaction chamber that consumes much valuable space. Bubbles are generated by the shear force of the high velocity gas/water mixture traveling around the tubes and through the narrow slit or series of small holes in each tube into the adjacent tube of increasingly smaller diameter. The combination of high velocity, high shear force, and forceful turbulence created in the horizontal reaction chamber of the present invention results in highly effective protein skimming from large volume water sources such as aquaria, tanks, lagoons, or other water sources.

The plurality of concentric tubes included in the horizontal reaction chamber is of varying diameters. For water purification (e.g., for aquaria, wastewater), a preferable construction of a horizontal reaction chamber will have a minimum outer diameter of 6" and a maximum outer diameter of 12", with 12" being the more preferred outer diameter. The outer diameter is dependent on the desired flow rate, with the smaller 6" outer diameter being more useful for flow rates up to 70 gallons/min and 12" outer diameter being more useful for flow rates up to 200 gallons/min. Flow capacity of a single reaction chamber of the present invention can range from 70–300 gallons/min. For example, a preferred construction of a horizontal reaction chamber for a protein skimmer for aquaria comprises five concentric tubes of 36" and of diameters 12", 10", 8", 6" and 4". A flow rate of 45–90 gallons/min can be achieved using this construction. Multiple units can be combined to increase skimming action for larger volume tanks, which may have flow rates approaching 2000 gallons/min.

Eductors are used to draw in gas (e.g., air, ozone, oxygen) and the gas/water mixture is distributed into the horizontal reaction chamber using a manifold with multilateral injectors. Injector manifolds can distribute water at various points along the horizontal reaction chamber to maximize tank coverage. A meter can be attached to valves leading to eductors so that flow rate can be adjusted to maximize efficiency and to adjust to varying protein loads within the water source.

This reaction chamber combines high velocity, high shear force, and circumferential counter-current water movement within the skimmer to produce a gas/water contact time unobtainable from any other protein skimmer. The skimmer can be completely disassembled and, when necessary, any part can be readily and easily replaced. A flange connecting the horizontal reaction chamber with the foam collection chamber facilitates easy transport, assembly, disassembly, and maintenance. The skimmer can have a transparent cover at the end of the horizontal reaction chamber to allow viewing of the mixing action and adjustment of the flow rate to maximize efficiency. The skimmer fits well into aquarium spaces with little headspace as well as in very small areas. The foam production from this protein skimmer is very stable and once the skimmer is set up, very little, if any, additional adjustment is required.

The operation of the protein skimmer with a horizontal reaction chamber is as follows:

Protein-loaded water from an aquarium tank, sump, lagoon, or other organic-loaded water source, is pumped into the skimmer. Before entering the skimmer, the water is mixed with gas, preferably air or a mixture of gases, preferably air and ozone, by eductor valves which introduce the air or air/ozone into the water with high velocity. The gas/water mixture is injected into the horizontal reaction chamber through at least one injector, preferably four to five separate injectors. Once injected, the gas/water mixture travels through a series of horizontally-directed, nested concentric tubes. The gas/water mixture first enters the largest of the nested horizontal tubes and then is forced into the next innermost tube through an opening, which can be a narrow slit or a series of small holes. The holes may be spaced approximately equidistant from each other and may be of similar or equal size and shape. For example, narrow slit openings preferably in the range from ¼" to ¾" in width can be used, with ⅜" being the more preferred width. The slit will generally run along the length of the tube. Alternatively, a series of small holes that runs generally along the length of the tube can be used, with the diameters of the holes ranging from ⅜" to ¾" with ½" preferred diameter of the holes. Preferably, a distance of ¼" should remain between holes for support of the tube. The preferred method of providing the opening is to use the series of small holes because this results in a considerably more stable structure.

A physical barrier runs down the centerline of the horizontal reaction chamber, such that it transects each of the concentric tubes except the innermost one. The physical barrier can be constructed of a variety of materials, including fiberglass (e.g., a fiberglass bolt can be used to form the barrier) and PVC cement or resin material. The physical barrier can also serve to hold the orientation of the concentric tubes relative to each other. Water from the largest of the nested horizontal tubes is then forced by the physical barrier into the next innermost tube through the narrow slits or series of small holes, and so on, until water enters the most central horizontal tube.

The openings in the concentric tubes occur at an angle offset from the openings in the previous tube by a small angle (e.g., 10°), with the direction of the offset alternating between clockwise and counterclockwise between adjacent tubes (e.g., between +10° and −10°). Water travels through adjacent tubes in a circumferential counter-current movement. This movement increases shear force and breaks air bubbles into considerably smaller air bubbles to increase efficiency of organic waste removal. The smallest and most central concentric tube carries the water out of the reaction chamber into the foam collection chamber. Once in the foam collection chamber, the foam rises to the top, carrying protein and organic contaminates with it. Water exits the bottom of the foam collection chamber substantially more free of protein and organic contaminates than when it entered.

This horizontal protein skimmer can be readily transported in sections and assembled on site. Flanges and flange bolts, preferably made of PVC, are used to couple the horizontal reaction chamber to the foam collection chamber.

It will be understood that the above-described arrangements of the apparatus are merely illustrative of applications of the principles of this invention and many other embodiments and modifications may be made without departing from the spirit and scope of the invention as defined in the claims.

What is claimed is:

1. A protein removal system for removing organic waste from contaminated water comprising:
   (A) an injector for providing the contaminated water,
   (B) an eductor for providing gas into the contaminated water,
   (C) a manifold comprising a plurality of ports for dispersing the contaminated water containing gas,
   (D) a horizontal reaction chamber for creating small bubbles of the gas in the contaminated water comprising:
      (1) a plurality of inlets corresponding to the plurality of ports on the manifold,
      (2) a set of nested, concentric tubes each having essentially the same length including an innermost tube, (3) a physical barrier between each pair of adjacent tubes extending along the length of the tubes, wherein the physical barriers are generally co-linear with each other, and (4) means for securing the position of the tubes relative to each other;

wherein each of the concentric tubes contains an opening along its length such that the openings in adjacent tubes are proximal to the physical barrier between the adjacent tubes and are on alternate sides of the barrier such that flow in adjacent tubes occurs in opposite circumferential directions, and the innermost tube comprises an outlet, and (E) a foam collection chamber which receives the contaminated water comprising the small gas bubbles from the outlet of the horizontal reaction chamber, comprising:

(1) a foam riser for collecting foam from the top of the foam collection chamber, (2) a tube or pipe for allowing purified water to exit the foam collection chamber.

2. A protein removal system as in claim 1, further comprising an end plate capping one end of the horizontal reaction chamber.

3. A protein removal system as in claim 1, wherein the openings comprise small orifices spaced substantially equidistant from each other along the length of each of the tubes.

4. A protein removal system as in claim 1, wherein multiple horizontal reaction chambers are attached to the foam collection chamber.

5. A protein removal system as in claim 1, wherein the horizontal reaction chamber is attached to the foam collection chamber using a flange and flange bolts.

6. A protein removal system as in claim 5 that is comprised of easily assembled sections that can be assembled in place.

7. A method for removing organic waste from a contaminated water source containing organic-loaded water, such as aquarium tanks, lagoons, effluent from agricultural applications, wastewater, or other water sources, comprising the steps of:

(A) mixing the contaminated water with gas, (B) providing a horizontal reaction chamber for creating small bubbles of the gas in the contaminated water comprising:

(1) an inlet for the contaminated water and gas mixture, (2) a set of nested, concentric tubes each having essentially the same length including an innermost tube and an outermost tube, (3) a physical barrier between each pair of adjacent tubes extending along the length of the tubes, wherein the physical barriers are generally co-linear with each other, (4) means for securing the position of the tubes relative to each other, and (5) an end plate capping one end of the chamber;

wherein each of the concentric tubes contains an opening along its length such that the openings in adjacent tubes are proximal to the physical barrier between the adjacent tubes and are on alternate sides of the barrier such that flow in adjacent tubes occurs in opposite circumferential directions, and the innermost tube comprises an outlet directed to a collection chamber; and (C) introducing the mixture of contaminated water and gas into the inlet of the horizontal reaction chamber so that the reaction chamber creates a high concentration of small gas bubbles in the contaminated water resulting in a foam, (D) collecting the foam from the outlet in the collection chamber and disposing of it, and (E) collecting purified water through a tube or pipe exiting the collection chamber.

* * * * *